Nov. 3, 1970     T. A. DOURDEVILLE     3,537,158
CONTROL FOR ROLL DRIVING MECHANISM FOR A NAPPING MACHINE
Filed Sept. 24, 1968     2 Sheets-Sheet 1
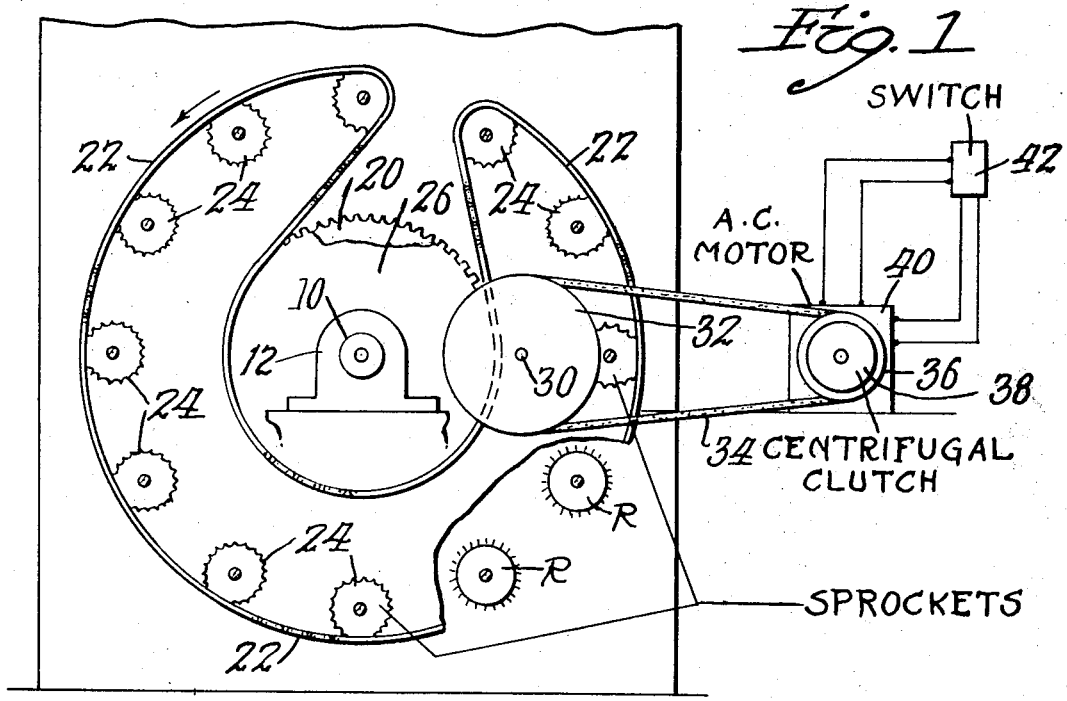
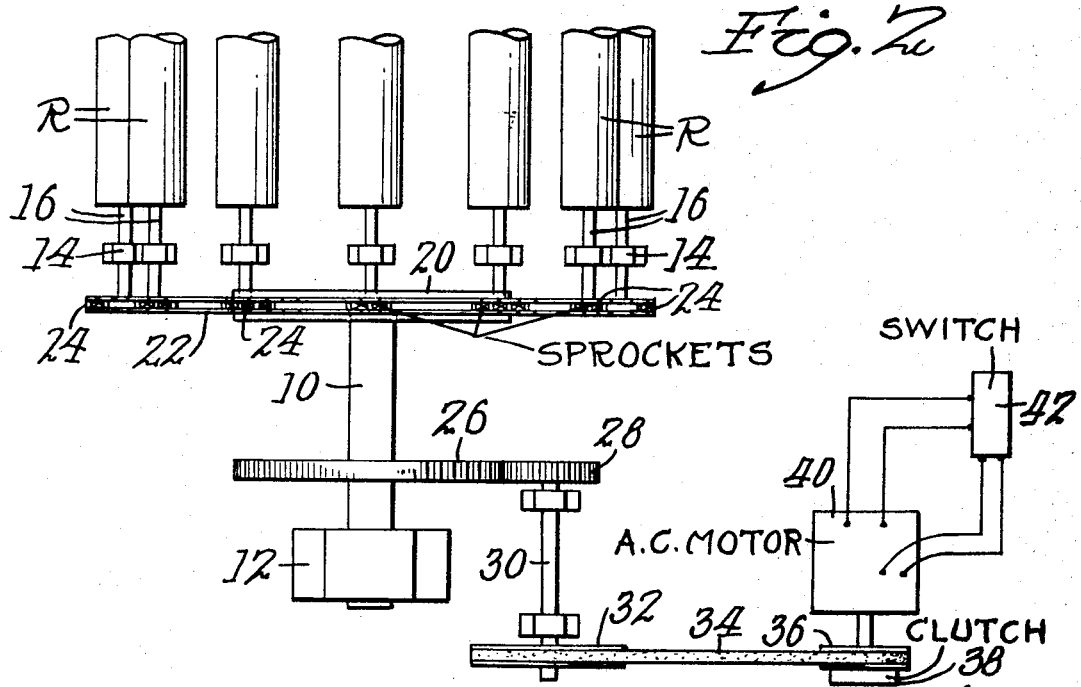
Inventor
Theodore A. Dourdeville
By Charles R. Fay,
Attorney

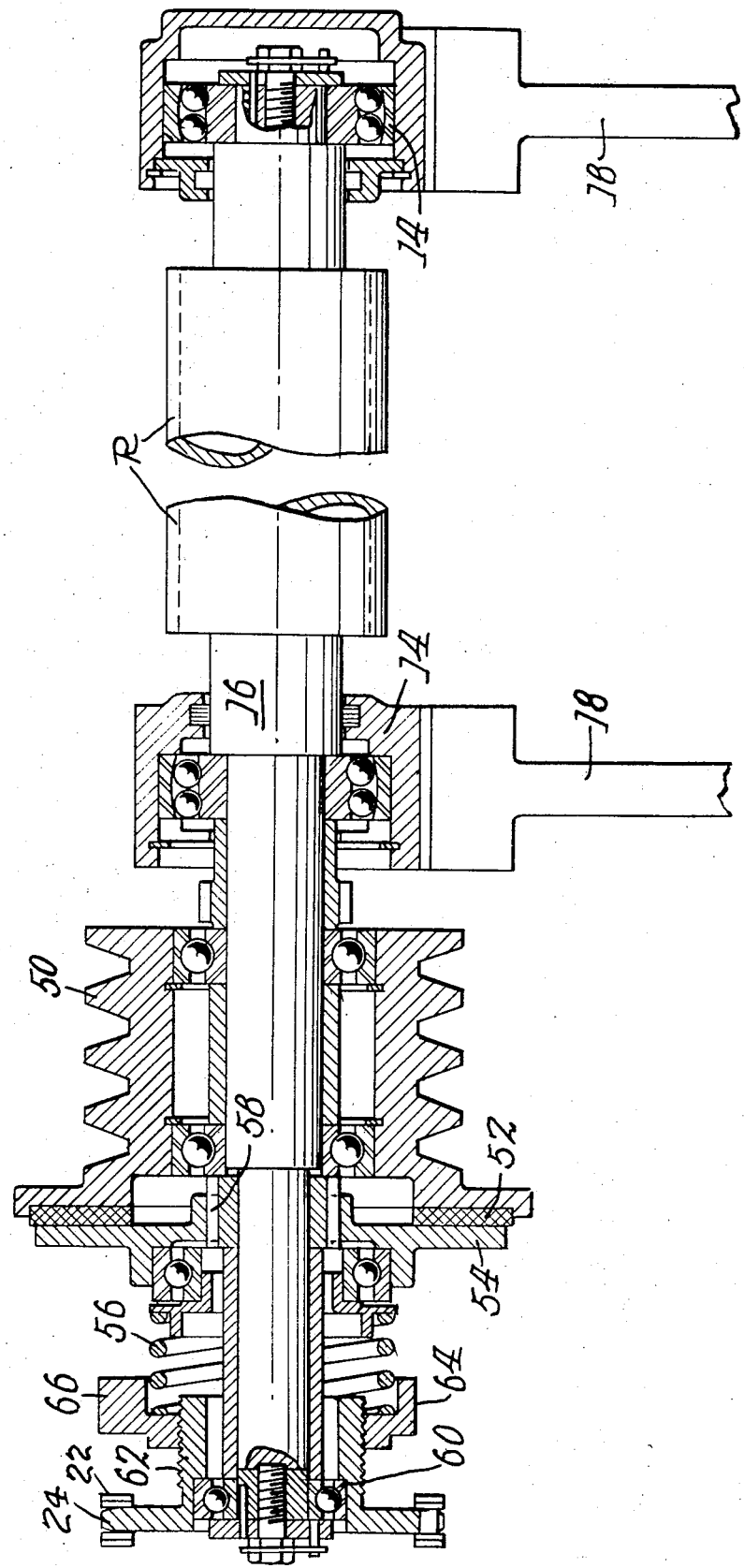

United States Patent Office 3,537,158
Patented Nov. 3, 1970

3,537,158
CONTROL FOR ROLL DRIVING MECHANISM FOR A NAPPING MACHINE
Theodore A. Dourdeville, Holden, Mass., assignor to David Gessner Company, Worcester, Mass., a corporation of Massachusetts
Filed Sept. 24, 1968, Ser. No. 761,915
Int. Cl. D06c 11/00
U.S. Cl. 26—35                                    9 Claims

ABSTRACT OF THE DISCLOSURE

A napping machine of the planetary type having napping rolls in a circle on a rotated carrier, driving means for each roll through a slip connection, and means for adjusting the degree of slip thereof under conditions of use, the adjusting means comprising for each roll a spring load clutch, a sprocket, and an endless chain engaging all the sprockets, said chain revolving on the carrier with the sprockets, and including means for traveling the chain relative to the sprockets, the latter adusting the degree of slip in the clutches.

BACKGROUND OF THE INVENTION

The napping surfaces of rolls in a napping machine apply a slight pull or drag to the cloth, accomplishing the pile and counter-pile napping effect.

Prior to the invention disclosed in U.S. Pat. 2,739,366, the operator of the machine selected a driven roll speed which was thereafter approximately maintained with but slight response to changes in load or operating conditions. The patent referred to provided novel torque control devices by means of constant volume pumps and hydraulic motors, etc., varying the effective torque of each roll by increasing or decreasing the net operating pressure on each motor responsive to the torque applied to produce the desired napping effect. This invention was a basic step forward in the art but still leaves unsolved the problem of situations where it is desired for the machine operator to control the degree of slippage to the best advantage with regard to the napping action on the particular material being processed, while at the same time relatively expensive to build.

It is the object of this invention therefore to provide a mechanical torque control device utilizing for instance an electric motor and means controlling the motor to vary the torque to the best advantage by increasing or decreasing slippage between the rolls and their driving means.

SUMMARY OF THE INVENTION

This invention comprises a napping machine of the planetary type having a rotary drum or carrier on which is mounted a series of rolls both for piling and counter-piling, each roll being driven by any desired means through a slip clutch (e.g. a friction disc device) or the like having a backup spring and an adjustment for increasing or decreasing pressure on the spring for varying the torque with regard to the responsive roll, each such adjustment means including a sprocket rotatably mounted with respect thereto, and an endless chain in engagement with all of the sprockets, so that when the chain is moved relatively to the sprockets, an adjustment with respect to said spring is accomplished in either direction. The chain is normally however in fixed relation with respect to said sprockets and revolves with the drum, the rolls, and the sprockets. In mesh with the chain there is a driver mechanism including an electric motor selectively actuatable in either direction moving the chain to rotate said sprockets relatively to the rolls, resulting in the adjustment above referred to while the machine is operating.

Thus should the degree of slippage vary from a desired norm as viewed on a suitable meter, it is only necessary to energize the motor (in the required direction) to cause the chain to move as desired to increase the slippage by backing off on the spring or to decrease the degree of slippage by tightening it.

BRIEF DESCRIPTION OF THE FIGURES

FIG. 1 is an end view of a planetary type napping machine with portions omitted for clarity of illustration;
FIG. 2 is a plan view thereof; and
FIG. 3 is a sectional view on an enlarged scale with parts broken away and illustrating one of the rolls controlled by the apparatus shown in FIGS. 1 and 2.

DESCRIPTION OF THE INVENTION

Referring first to FIGS. 1 and 2 there are here shown parts of a planetary type napping machine with the adjustment parts illustrated but the driving mechanism for the rolls omitted. There is a casing (not shown) in which a main shaft generally indicated for instance at 10 is mounted in fixed bearings as at 12 for continuous revolution at a uniform speed of a plurality of pile napping and counter-pile napping rolls which are indicated at R. These rolls are sometimes referred to as "work rolls" and their function is well understood in the art. These rolls are revolved bodily about the axis of shaft 10 and they are also provided with a rotary motion on their own axes. They are mounted as for instance on bearings 14 on shafts 16, see FIG. 2, the bearings 14 being mounted on heads 18, see FIG. 3, the latter being fixed to the shaft 10 and rotated thereby.

Conveniently supported on shaft 10 but in no way controlled thereby is a relatively large sprocket member 20. This sprocket member is in mesh with an endless chain 22 which extends around a large part of the periphery of the sprocket 20 and is also continuously engaged with a series of small sprockets 24 mounted at the ends of the shafts in a manner disclosed in FIG. 3 which will be set forth hereinafter.

Fixedly with relation to the sprocket 20 is a gear 26 which may also be conveniently mounted with respect to the main shaft 10 but not driven thereby, gear 26 being in mesh with a pinion 28 on a shaft 30, the latter being mounted in suitable bearings, FIG. 2, and having a driving pulley 32 driven as for instance by a belt 34 from the driver 36 of a centrifugal clutch 38 which is adapted to be driven by a motor 40. Motor 40 is of a well known type which may be quickly and easily started, stopped, and reversed through a commercial switch generally indicated at 42 under control of the operator of the machine.

As explained, slippage may vary due to the nature of the cloth being processed or for other reasons, but the operator will be aware of this slippage by conventional indicators. For instance, a normal slip condition would be e.g., 110 but if it varies between 100 or 120 for instance, then by means of the aparatus described, the operator may increase or decrease the slippage of the drive relative to the rolls in order to retain the desired normal 110.

Referring now to FIG. 3, a pulley 50 or other driver is rotatably mounted on each shaft 16 for each roll R and is driven by any convenient means which will be clear to those skilled in the art. At one end, each pulley 50 is provided with a friction disc 52 with which is engaged a clutch plate 54 backed by an adjustable spring 56. It will be clear that the greater the pressure on spring 56, the greater will be the friction with respect to the driving pulley 50 and therefore the greater pull will be exerted on the drive for the rolls which is through for instance a spline 58 between the clutch plate 54 and shaft 16.

Each sprocket 24 is rotatably mounted as for instance on a bearing 60 to be rotatable independently of drive shaft 16 and each sprocket has a threaded element 62 which is in mesh with a nut or the like 64 which is held in nonrotative relationship by means of radial pins, fingers or the like 66 which can be conveniently mounted on the rotary heads. In other words, nut 64 may travel axially, compressing spring 56 when traveled to the right in FIG. 3, and increasing the torque, and reducing the pressure on the spring when traveled to the left. This travel is accomplished by relative rotation of the sprockets 24 under influence of the chain 22.

In the operation of the device, the chain 22 revolves bodily with the sprockets 24 normally in fixed relationship with respect thereto, and rotating shaft 30 through gears 26 and 28. The centrifugal clutch 38 is set so that the motor is not operative and pulley 36 runs free.

However when a change is needed, the operator throws the switch 42 in the direction necessary and to such a degree as to actuate motor 40 engaging the clutch 38 and varying the speed of rotation of the gearing 32, 30, 28, 26, etc., to thereby turn sprockets 24, relative to the axis of shafts 16 (either speeded up or slowed down) relative to the normal rotation thereof under influence of the planetary motion of the rolls, and this clearly will then in turn cause chain 22 to travel relative to the sprockets 24, thus causing the sprockets to turn in the direction called for by the chain to translate the nuts in the required direction to either tighten or loosen the clutch plate relative to the friction disc. It is of course possible to apply so much presure to the spring that there will be no slip but this condition is normally not desired.

I claim:

1. A planetary type of napping machine comprising a shaft, a set of napping rolls mounted to revolve about the shaft, means driving the shaft, means rotating each roll on its own axis, the last named means including a slip mechanism for each roll, means for adjusting the degree of slippage of each roll, said adjustment means being purely mechanical, and a single control means for operating said mechanical adjusting means simultaneously while the rolls are in operation.

2. The napping machine of claim 1 wherein said adjustment means includes a substantially endless flexible member operatively engaged with respect to said adjusting mechanisms for all the rolls, and the single control means being arranged to travel said endless member selectively in either direction.

3. The napping machine of claim 1 wherein the adjustment means comprises a rotary member for each slip mechanism, and an endless flexible member engaged therewith, the single control means being operable to drive said flexible member to turn said rotary members.

4. The napping machine of claim 1 wherein the adjustment means comprises a rotary member for each slip mechanism, and an endless flexible member engaged therewith, the single control means being operable to drive said flexible member to turn said rotary members, said rotary members each comprising a sprocket and said flexible member comprising an endless chain.

5. The napping machine of claim 1 wherein the adjustment means comprises a rotary member for each slip mechanism, and an endless flexible member engaged therewith, the single control means being operable to drive said flexible member to turn said rotary members, said rotary members each comprising a sprocket and said flexible member comprising an endles chain, the latter normally revolving with said rolls in a fixed relationship with respect thereto.

6. The napping machine of claim 1 wherein said slip mechanism comprises a friction clutch between each roll and the means rotating it, a spring bearing on the clutch to cause it to drive its roll, and an axially movable but nonrotatable element bearing on each spring to vary the degree of force that the spring exerts on the clutch, said adjustment operating means being effective to axially move the nonrotatable element.

7. The napping machine of claim 1 wherein said slip mechanism comprises a friction clutch, a spring bearing thereon, an axially movable but nonrotatable element bearing on each spring, and the adjustment means including a member for axially moving said nonrotatable element.

8. The napping machine of claim 1 wherein said slip mechanism comprises a friction clutch, a spring bearing thereon, an axially movable but nonrotatable element bearing on each spring, and the adjustment means including a member for axially moving said nonrotatable element, and an endless flexible member operative to actuate the members for moving the nonrotatable elements.

9. The napping machine of claim 1 wherein said slip mechanism comprises a friction clutch, a spring bearing thereon, an axially movable but nonrotatable nut bearing on each spring, the adjustment means including a toothed member for axially moving said nut, and an endless flexible chain engaged with the toothed members and operative to actuate the toothed members for moving the nuts.

References Cited

UNITED STATES PATENTS

| 474,203 | 5/1892 | Adams | 192—94 |
| 2,722,301 | 11/1955 | Francois | 192—94 XR |
| 2,956,656 | 10/1960 | Becksted | 192—94 XR |
| 1,721,985 | 7/1929 | Brunner | 26—34 |
| 3,390,437 | 7/1968 | Scholaert | 26—35 |

FOREIGN PATENTS

| 235,355 | 6/1911 | Germany. |
| 611,001 | 10/1948 | Great Britain. |

ROBERT R. MACKEY, Primary Examiner

U.S. Cl. X.R.

192—48.2, 94